US012782278B2

(12) United States Patent
Long et al.

(10) Patent No.: US 12,782,278 B2
(45) Date of Patent: Nov. 3, 2026

(54) ULTRAFAST DIFFRACTION IMAGING SYSTEM AND METHOD, AND STORAGE MEDIUM

(71) Applicant: WUYI UNIVERSITY, Jiangmen (CN)

(72) Inventors: Jiale Long, Jiangmen (CN); Jiangtao Xi, Jiangmen (CN); Kesen Huang, Jiangmen (CN); Jianmin Zhang, Jiangmen (CN); Chuisong Meng, Jiangmen (CN); Zhao Ma, Jiangmen (CN); Yingrong Li, Jiangmen (CN); Jian Pan, Jiangmen (CN); Jiekai Zhuo, Jiangmen (CN); Haoming Huang, Jiangmen (CN); Zaiming Li, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 254 days.

(21) Appl. No.: 18/710,413

(22) PCT Filed: Dec. 14, 2023

(86) PCT No.: PCT/CN2023/138810
§ 371 (c)(1),
(2) Date: May 15, 2024

(87) PCT Pub. No.: WO2024/193128
PCT Pub. Date: Sep. 26, 2024

(65) Prior Publication Data

US 2026/0168926 A1 Jun. 18, 2026

(30) Foreign Application Priority Data

Mar. 20, 2023 (CN) ........................ 202310276290.1

(51) Int. Cl.
*G01N 21/47* (2006.01)
*H04N 23/56* (2023.01)
*H04N 23/95* (2023.01)

(52) U.S. Cl.
CPC ......... *G01N 21/4788* (2013.01); *H04N 23/56* (2023.01); *H04N 23/95* (2023.01);
(Continued)

(58) Field of Classification Search
CPC ..... G01N 21/4788; G01N 2201/06113; G01N 2201/0633; G01N 2201/0636; H04N 23/56; H04N 23/95
See application file for complete search history.

(56) References Cited

U.S. PATENT DOCUMENTS

| | | | | |
|---|---|---|---|---|
| 2021/0088384 A1* | 3/2021 | Wang | .................. | H04N 19/593 |
| 2023/0283917 A1* | 9/2023 | Liang | .................... | H04N 23/95 348/222.1 |

FOREIGN PATENT DOCUMENTS

| | | |
|---|---|---|
| CN | 110864806 A | 3/2020 |
| CN | 111537477 A | 8/2020 |

(Continued)

OTHER PUBLICATIONS

International Searching Authority. International Search Report and Written Opinion for PCT Application No. PCT/CN2023/138810 and English translation, mailed Feb. 20, 2024, pp. 1-15.

*Primary Examiner* — Abdelaaziz Tissire
(74) *Attorney, Agent, or Firm* — Vivacqua Crane, PLLC

(57) ABSTRACT

An ultrafast diffraction imaging system and method, and a storage medium are disclosed. The ultrafast diffraction imaging system includes: a laser generation module configured to emit laser; a time stretching module optically connected to the laser generation module and configured to stretch the laser into a time data stream; an encoding module optically connected to the time stretching module and con-
(Continued)

figured to perform encoding according to the time data stream to obtain an encoding matrix; an image acquisition module connected to the encoding module and configured to capture the encoding matrix to obtain an observed image; and a control processing module respectively in communicative connection with the laser generation module and the image acquisition module, and configured to perform phase reconstruction according to the observed image transmitted by the image acquisition module to obtain a target phase change sequence frame.

6 Claims, 3 Drawing Sheets

(52) U.S. Cl.
CPC .............. *G01N 2201/06113* (2013.01); *G01N 2201/0633* (2013.01); *G01N 2201/0636* (2013.01)

(56) References Cited

FOREIGN PATENT DOCUMENTS

| | | | | | |
|---|---|---|---|---|---|
| CN | 113237551 | A | | 8/2021 | |
| CN | 113890624 | A | | 1/2022 | |
| CN | 114326099 | A | | 4/2022 | |
| CN | 114509406 | A | * | 5/2022 | ......... G01N 21/4738 |
| CN | 115348434 | A | | 11/2022 | |
| CN | 116297582 | A | | 6/2023 | |
| JP | 2018021891 | A | * | 2/2018 | |

* cited by examiner

ULTRAFAST DIFFRACTION IMAGING SYSTEM AND METHOD, AND STORAGE MEDIUM

CROSS-REFERENCE TO RELATED APPLICATIONS

This application is a national stage filing under 35 U.S.C. § 371 of international application number PCT/CN2023/138810, filed Dec. 14, 2023, which claims priority to Chinese patent application No. 202310276290.1 filed Mar. 20, 2023. The contents of these applications are incorporated herein by reference in their entirety.

TECHNICAL FIELD

The present disclosure relates to, but is not limited to, the technical field of ultrafast imaging, and in particular to an ultrafast diffraction imaging system and method, and storage medium.

BACKGROUND

Ultrafast imaging is essentially the manifestation of high-resolution projection of photoelectric imaging in the time dimension, which can provide the image characterization with finer granularity of photoelectric imaging in the time dimension. The application of ultrafast imaging technology holds significant value in scientific research and engineering applications for recording transient diffraction processes. The application scenarios for ultrafast imaging technology include shock wave propagation, laser-induced ultrafast processes and exciton diffusion. General array photoelectric sensors can only sense the intensity of light signals, and lack phase information, which cannot record the phase change of light signal in the diffraction process. In related art, ultrafast interferometry is usually used to observe phase changes in optical signals during diffraction. This involves sequentially illuminating the sample with multiple laser pulses and interfering with an additional reference light beam, followed by exposure using a single detector to record interference patterns. However, the use of reference beams complicates the optical structure of the imaging system and reduces imaging efficiency.

SUMMARY

Embodiments of the present disclosure provide an ultrafast diffraction imaging system and method, and a storage medium. The efficiency of ultrafast diffraction imaging can be effectively improved.

In a first aspect, an embodiment of the present disclosure provides an ultrafast diffraction imaging system, including:

- a laser generation module, which is configured to emit laser;
- a time stretching module, which is optically connected to the laser generation module and configured to stretch the laser into a time data stream;
- an encoding module, which is optically connected to the time stretching module and configured to perform encoding according to the time data stream to obtain an encoding matrix;
- an image acquisition module, which is connected to the encoding module and configured to capture the encoding matrix to obtain an observed image; and
- a control processing module, which is respectively in communicative connection with the laser generation module and the image acquisition module, and configured to perform phase reconstruction according to the observed image transmitted by the image acquisition module to obtain a target phase change sequence frame.

The ultrafast diffraction imaging system according to an embodiment of the first aspect of the present disclosure has at least the following beneficial effects. The ultrafast diffraction imaging system includes a laser generation module, a time stretching module, an encoding module, an image acquisition module, and a control processing module, where the time stretching module is optically connected to the laser generation module, the encoding module is optically connected to the time stretching module, the image acquisition module is connected to the encoding module, and the control processing module is respectively in communicative connection with the laser generation module and the image acquisition module. The control processing module controls the laser generation module to emit laser, the laser arrives at the time stretching module along an optical path, and the laser is stretched into a time data stream by the time stretching module using the decomposability of the laser in the spatial domain and the time domain, so that the encoding module encodes the time data stream using the characteristics of the laser with different pulse frequency components in the time data stream to obtain an encoding matrix. The encoding matrix is then transmitted to the image acquisition module along the optical path, and the image acquisition module is used to capture the encoding matrix and can realize the capturing of an ultrafast dynamic scene to obtain an observed image. The control processing module then performs phase reconstruction according to the observed image transmitted by the image acquisition module to obtain a target phase change sequence frame, which can effectively improve the efficiency of the ultrafast diffraction imaging, so as to realize the observation of phase changes in ultrafast dynamic scenes. Based on the ultrafast diffraction imaging system provided in the present disclosure, using the decomposability of a laser in a spatial domain and a time domain, time-stretching and encoding are performed on the laser successively, and an encoding matrix obtained by encoding is transmitted to the image acquisition module along an optical path, so that the image acquisition module captures the encoding matrix to obtain an observed image to achieve the capturing of an ultrafast dynamic scene, and finally the control processing module performs phase reconstruction according to the observed image to obtain a target phase change sequence frame to achieve the observation of phase changes in ultrafast dynamic scenes. Compared with the technical solution in related art that involves sequentially illuminating the sample with multiple laser pulses and interfering with an additional reference light beam, followed by exposure using a single detector to record interference patterns to observe the phase changes in optical signals during diffraction, the present disclosure can effectively improve the efficiency of ultrafast diffraction imaging.

According to some embodiments of the first aspect of the present disclosure, the ultrafast diffraction imaging system further includes a filtering module which includes an objective lens and a pinhole, the objective lens is optically connected to the time stretching module and the pinhole, respectively, and the pinhole is optically connected to the encoding module.

According to some embodiments of the first aspect of the present disclosure, the time stretching module includes a spatial disperser and a time disperser, the spatial disperser is optically connected to the time disperser.

According to some embodiments of the first aspect of the present disclosure, the encoding module includes a first mirror, a second mirror, a collimator, and a mask plate; the first mirror, the collimator, the mask plate and the second mirror are optically connected successively.

In a second aspect, an embodiment of the present disclosure provides an ultrafast diffraction imaging method applied to the control processing module of the ultrafast diffraction imaging system of the first aspect, the method including:

- acquiring the observed image transmitted by the image acquisition module;
- processing the observed image using a preset dispersion Fourier transform formula to obtain a frequency-time mapping;
- processing, according to a preset light wave diffraction algorithm, the observed image based on the frequency-time mapping to obtain a diffraction pattern sequence frame; and
- performing phase reconstruction on the diffraction pattern sequence frame using a preset phase reconstruction algorithm to obtain a target phase change sequence frame.

The ultrafast diffraction imaging method according to an embodiment of the second aspect of the present disclosure has at least the following beneficial effects. By acquiring an observed image transmitted by an image acquisition module, processing the observed image using a preset dispersion Fourier transform formula to obtain a frequency-time mapping, processing, according to a preset light wave diffraction algorithm, the observed image based on the frequency-time mapping to obtain a diffraction pattern sequence frame, the calculation efficiency can be effectively improved. Then by performing phase reconstruction on the diffraction pattern sequence frame using a preset phase reconstruction algorithm to obtain a target phase change sequence frame, the efficiency of ultrafast diffraction imaging can be effectively improved while realizing the observation of phase changes in ultrafast dynamic scenes.

According to some embodiments of a second aspect of the present disclosure, the dispersion Fourier transform formula is:

$$A(L,T)=\exp\left[i\frac{T^2}{2\beta_2 L}\right]\dot{A}(0,\omega)\Big|_{\omega=\frac{T}{\beta_2^L}},$$

wherein β is a propagation constant of an optical fiber, ω is an angular frequency, $\omega_0$ is a centre frequency of a dissipative structure, T is time within a reference frame, $T=t-\beta_1 L$, L is a length of the optical fiber, t is time of the optical fiber, and m order derivative of β is $$\beta_m=\frac{d^m\beta}{d\omega^m}\Big|_{\omega=\omega_0}.$$

According to some embodiments of the second aspect of the present disclosure, the light wave diffraction algorithm is:

$$U_P(x,y,z)=\mathcal{F}^{-1}\mathcal{F}\left[[U_P(x,y)]e^{i\frac{2\pi z}{\lambda}\sqrt{1-(\lambda f_x)^2-(\lambda f_y)^2}}\right],$$

wherein $U_P(x,y)$ is a phasor of the observed image, $$e^{i\frac{2\pi z}{\lambda}\sqrt{1-(\lambda f_x)^2-(\lambda f_y)^2}}$$

is a phase delay factor, and $\mathcal{F}$ is a Fourier transform sign.

According to some embodiments of the second aspect of the present disclosure, the performing phase reconstruction on the diffraction pattern sequence frame using a preset phase reconstruction algorithm to obtain a target phase change sequence frame includes:

- performing iterative calculation of an output light wave function according to a preset initial phase and first light wave amplitude distribution data of the diffraction pattern sequence frame, until the mean square error sum of the output light wave function is less than a preset error threshold, where in the iterative calculation of the output light wave function, each successful calculation results in a reference diffraction pattern based on the output light wave function; and
- performing phase reconstruction on a plurality of reference diffraction patterns according to a preset phase reconstruction rule to obtain the target phase change sequence frame.

According to some embodiments of the second aspect of the present disclosure, the performing iterative calculation of an output light wave function according to a preset initial phase and first light wave amplitude distribution data of the diffraction pattern sequence frame includes:

- obtaining an incident light wave function according to a preset initial phase and first light wave amplitude distribution data of the diffraction pattern sequence frame;
- performing Fourier transform on the incident light wave function to obtain an output light wave function and second light wave amplitude distribution data;
- obtaining a reference function according to a first phase of the output light wave function and the second light wave amplitude distribution data;
- performing inverse Fourier transform on the reference function to obtain an objective function; and
- updating the initial phase with a second phase of the objective function, and recalculating a new output light wave function according to the updated initial phase.

In a third aspect, an embodiment of the present disclosure further provides a computer-readable storage medium storing computer-executable instructions for causing a computer to perform the ultrafast diffraction imaging method as claimed in the second aspect.

BRIEF DESCRIPTION OF DRAWINGS

The accompanying drawings are used to provide a further understanding of the technical solutions of the present disclosure and form part of the specification and, together with the embodiments of the present disclosure, are used to explain the technical solutions of the present disclosure and do not constitute a limitation of the technical solutions of the present disclosure.

DETAILED DESCRIPTION

Figure 1:
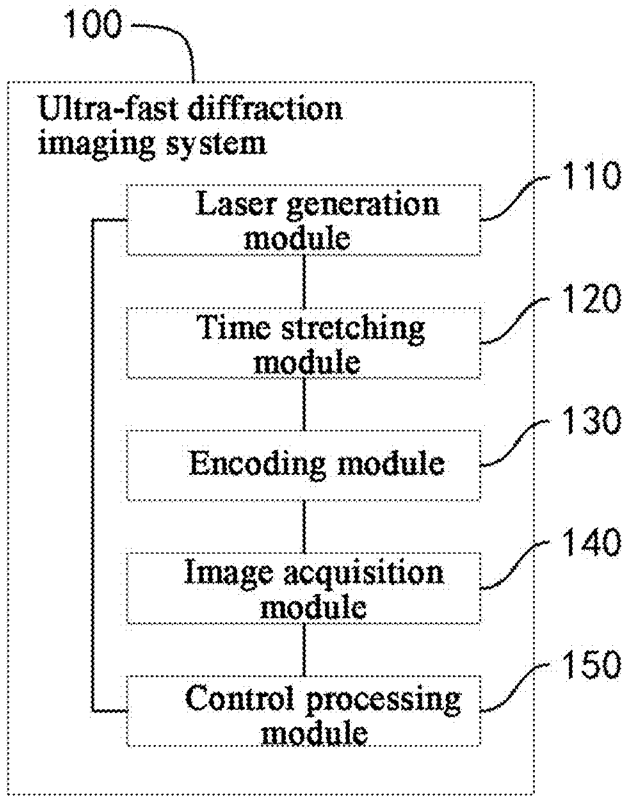
FIG. 1 is a schematic diagram of an ultrafast diffraction imaging system provided in an embodiment of the present disclosure.

In order to make the objectives, technical solutions and advantages of the present disclosure clearer and understandable, the present disclosure is further described in detail below in conjunction with the accompanying drawings and embodiments. It should be understood that the specific embodiments described herein are for the purpose of explaining the present disclosure only and are not intended to limit the present disclosure.

It will be appreciated that although the division of functional modules is illustrated in a schematic diagram of an apparatus and a logical sequence is illustrated in a flowchart, in some cases, the steps illustrated or described may be performed in an order different from that of the division of modules in the apparatus or the sequence in the flowchart. The terms "first", "second", etc. in the description, the claims, or the above figures are used to distinguish similar objects, rather than to describe a particular order or sequence.

The present disclosure provides an ultrafast diffraction imaging system and method, and a storage medium. The ultrafast diffraction imaging system includes a laser generation module, a time stretching module, an encoding module, an image acquisition module, and a control processing module. The time stretching module is optically connected to the laser generation module, the encoding module is optically connected to the time stretching module, the image acquisition module is connected to the encoding module, and the control processing module is respectively in communicative connection with the laser generation module and the image acquisition module. The control processing module controls the laser generation module to emit laser, the laser arrives at the time stretching module along an optical path, and the laser is stretched into a time data stream by the time stretching module using the decomposability of the laser in the spatial domain and the time domain, so that the encoding module encodes the time data stream using the characteristics of the laser with different pulse frequency components in the time data stream to obtain an encoding matrix. The encoding matrix is then transmitted to the image acquisition module along the optical path, and the image acquisition module is used to capture the encoding matrix and can realize the capturing of an ultrafast dynamic scene to obtain an observed image. The control processing module then performs phase reconstruction according to the observed image transmitted by the image acquisition module to obtain a target phase change sequence frame, which can effectively improve the efficiency of the ultrafast diffraction imaging, so as to realize the observation of phase changes in ultrafast dynamic scenes. Based on the ultrafast diffraction imaging system provided in the present disclosure, using the decomposability of a laser in a spatial domain and a time domain, time-stretching and encoding are performed on the laser successively, and an encoding matrix obtained by encoding is transmitted to the image acquisition module along an optical path, so that the image acquisition module captures the encoding matrix to obtain an observed image to achieve the capturing of an ultrafast dynamic scene, and finally the control processing module performs phase reconstruction according to the observed image to obtain a target phase change sequence frame to achieve the observation of phase changes in ultrafast dynamic scenes. Compared with the technical solution in related art that involves sequentially illuminating the sample with multiple laser pulses and interfering with an additional reference light beam, followed by exposure using a single detector to record interference patterns to observe the phase changes in optical signals during diffraction, the present disclosure can effectively improve the efficiency of ultrafast diffraction imaging.

The embodiments of the present disclosure are further described below in conjunction with the accompanying drawings.

Referring to FIG. 1, which is a schematic diagram of an ultrafast diffraction imaging system provided in an embodiment of the present disclosure, the ultrafast diffraction imaging system 100 includes:

a laser generation module 110, which is configured to emit laser;

a time stretching module 120, which is optically connected to the laser generation module 110 and configured to stretch the laser into a time data stream;

an encoding module 130, which is optically connected to the time stretching module 120 and configured to perform encoding according to the time data stream to obtain an encoding matrix;

an image acquisition module 140, which is connected to the encoding module 130 and configured to capture the encoding matrix to obtain an observed image; and a control processing module 150, which is respectively in communicative connection with the laser generation module 110 and the image acquisition module 140, and configured to perform phase reconstruction according to the observed image transmitted by the image acquisition module 140 to obtain a target phase change sequence frame.

It should be noted that the embodiments of the present disclosure do not limit the specific type of the laser generation module 110, which may be a mode-locked laser, a femtosecond pulse laser, a fiber laser, etc. The embodiments of the present disclosure do not limit the specific type of the image acquisition module 140 either, which may be a synchronous stripe camera, a femtosecond stripe camera, a high-dynamic range stripe camera, etc.

It will be appreciated that the control processing module 150 controls the laser generation module 110 to emit laser, the laser arrives at the time stretching module 120 along an optical path, and the laser is stretched into a time data stream by the time stretching module 120 using the decomposability of the laser in the spatial domain and the time domain, so that the encoding module 130 encodes the time data stream using the characteristics of the laser with different pulse frequency components in the time data stream to obtain an encoding matrix. The encoding matrix is then transmitted to the image acquisition module 140 along the optical path, and the image acquisition module 140 is used to capture the encoding matrix and can realize the capturing of an ultrafast dynamic scene to obtain an observed image. The control processing module 150 performs phase reconstruction according to the observed image transmitted by the image acquisition module 140 to obtain a target phase change sequence frame, which can realize high-precision quantitative imaging of the phase process of non-repeatable ultrafast dynamic scenes, and can effectively improve the efficiency of ultrafast diffraction imaging while realizing the observation of phase changes in ultrafast dynamic scenes. Based on the ultrafast diffraction imaging system 100 provided in the present disclosure, using the decomposability of a laser in a spatial domain and a time domain, time-stretching and encoding are performed on the laser successively, and an encoding matrix obtained by encoding is transmitted to the image acquisition module 140 along an optical path, so that the image acquisition module 140 captures the encoding matrix to obtain an observed image to achieve the capturing of an ultrafast dynamic scene, and finally the control processing module 150 performs phase reconstruction according to the observed image to obtain a target phase change sequence frame to achieve the observation of phase changes in ultrafast dynamic scenes. Compared with the technical solution in related art that involves sequentially illuminating the sample with multiple laser pulses and interfering with an additional reference light beam, followed by exposure using a single detector to record interference patterns to observe the phase changes in optical signals during diffraction, the present disclosure can effectively improve the efficiency of ultrafast diffraction imaging with no specific light source constraints needed and with a simple optical path.

Figure 2:
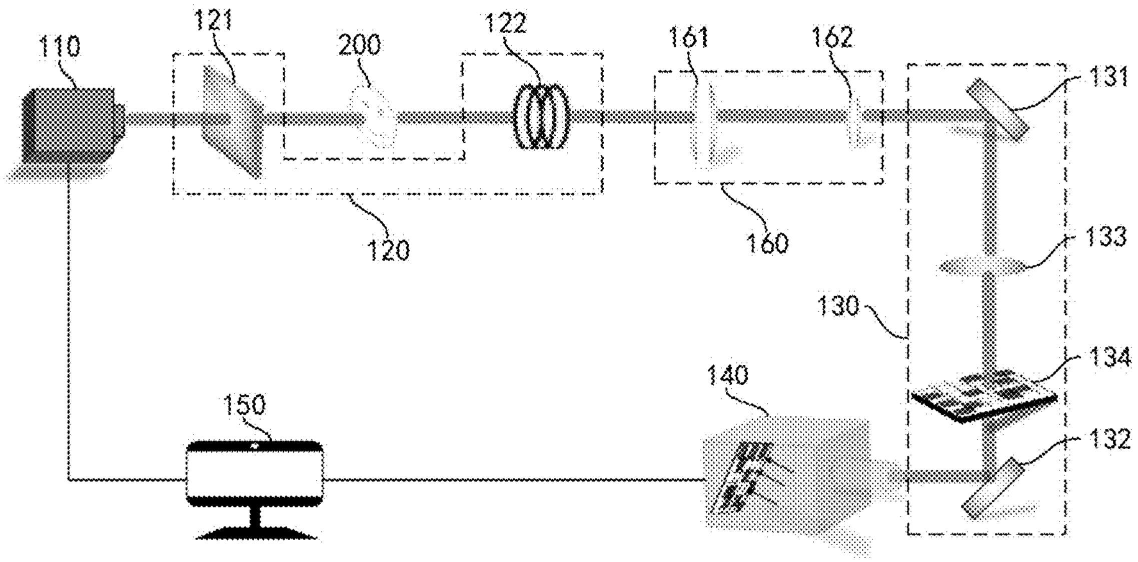
FIG. 2 is a schematic diagram of an optical path of the ultrafast diffraction imaging system provided in another embodiment of the present disclosure.

Referring to FIG. 2, in some embodiments of the present disclosure, the ultrafast diffraction imaging system 100 further includes a filtering module 160 which includes an objective lens 161 and a pinhole 162, the objective lens 161 is optically connected to the time stretching module 120 and the pinhole 162, respectively, the pinhole 162 is optically connected to the encoding module 130.

It should be noted that the embodiments of the present disclosure do not limit the type of the objective lens 161, which may be a 4× objective lens, a 10× objective lens, etc. It will be appreciated that the use of a 4× objective can reduce light loss.

It will be appreciated that the objective lens 161 is optically connected to the time stretching module 120 and the pinhole 162, respectively, and the pinhole 162 is optically connected to the encoding module 130. The time stretching module 120 performs time-stretching on laser to obtain a time data stream, and the time data stream successively passes through the objective lens 161 and the pinhole 162 of the filtering module 160 to perform spatial filtering on the time data stream, thereby improving the quality of the output time data stream, facilitating encoding by the encoding module 130, and effectively improving the accuracy and efficiency of encoding.

In some embodiments of the present disclosure, the time stretching module 120 includes a spatial disperser 121 and a time disperser 122, the spatial disperser 121 is optically connected to the time disperser 122.

It can be appreciated that the laser generated by the laser generation module 110 passes through the spatial disperser 121 and the time disperser 122 in sequence along the optical path, the laser enters the spatial disperser 121 along the optical path, and the spatial disperser 121 maps the laser into a 1D or 2D rainbow beam. Moreover, a dynamic sample 200 is placed behind the spatial disperser 121, and the rainbow beam can illuminate the dynamic sample 200. Since the pulse frequency components of the laser are different, and the spatial coordinates corresponding to the dynamic sample 200 are also different, it is possible to encode the rainbow beam. The encoded rainbow beam returns to the spatial disperser 121, the spatial disperser 121 recombines the encoded rainbow beam into a single laser pulse, the laser pulse enters the time disperser 122 along the optical path, and the time disperser 122 performs pulse spectrum mapping or time-stretching on the laser pulse into a 1D time data stream.

In some embodiments of the present disclosure, the encoding module 130 includes a first mirror 131, a second mirror 132, a collimator 133, and a mask plate 134. The first mirror 131, the collimator 133 and the mask plate 134 and the second mirror 132 are optically connected successively.

It should be noted that the embodiments of the present disclosure do not limit the specific number and position of the mirrors, which can include a first mirror 131 and a second mirror 132, and can also include a first mirror 131, a second mirror 132, a third mirror, a fourth mirror, etc. to enable angular adjustment of a time data stream, so as to accurately transmit the time data stream to a target position.

It will be appreciated that the time data stream is transmitted to the encoding module 130 along the optical path, and successively passes through the first mirror 131, the collimator 133, the mask plate 134 and the second mirror 132. The first mirror 131 performs angle adjustment on the time data stream so that the time data stream accurately reaches the collimator 133. The light beam of the time data stream is collimated by the collimator 133 to improve directional stability; and the time data stream is guided to irradiate the mask plate 134 to obtain an encoding matrix. The mask plate 134 is pre-loaded with a random matrix, and the random matrix on the mask 134 is used to perform encoding according to the time data stream, which can effectively improve the encoding efficiency while ensuring the encoding accuracy. The second mirror 132 is then used to transmit the encoding matrix to the image acquisition module 140, and the encoding matrix reaches the image acquisition module 140 with the slit fully opened, so that the image acquisition module 140 captures the encoding matrix, and records an ultrafast dynamic scene to obtain an observed image.

It will be appreciated that the ultrafast diffraction imaging system 100 provided in an embodiment of the present disclosure achieves ultrafast dynamic scene phase imaging with high spatial and time resolution using a simple optical setup, and that lasers of different pulse durations may be used to achieve time resolution on nanosecond to femtosecond scales. Performing quantitative characterization for ultrafast dynamic scene phase processes, such as transient changes of materials caused by electromagnetic radiation, interaction between laser and substances, and laser entering biological cells, achieves high-precision quantitative imaging of non-repeatable ultrafast dynamic scene phase processes.

Figure 3:
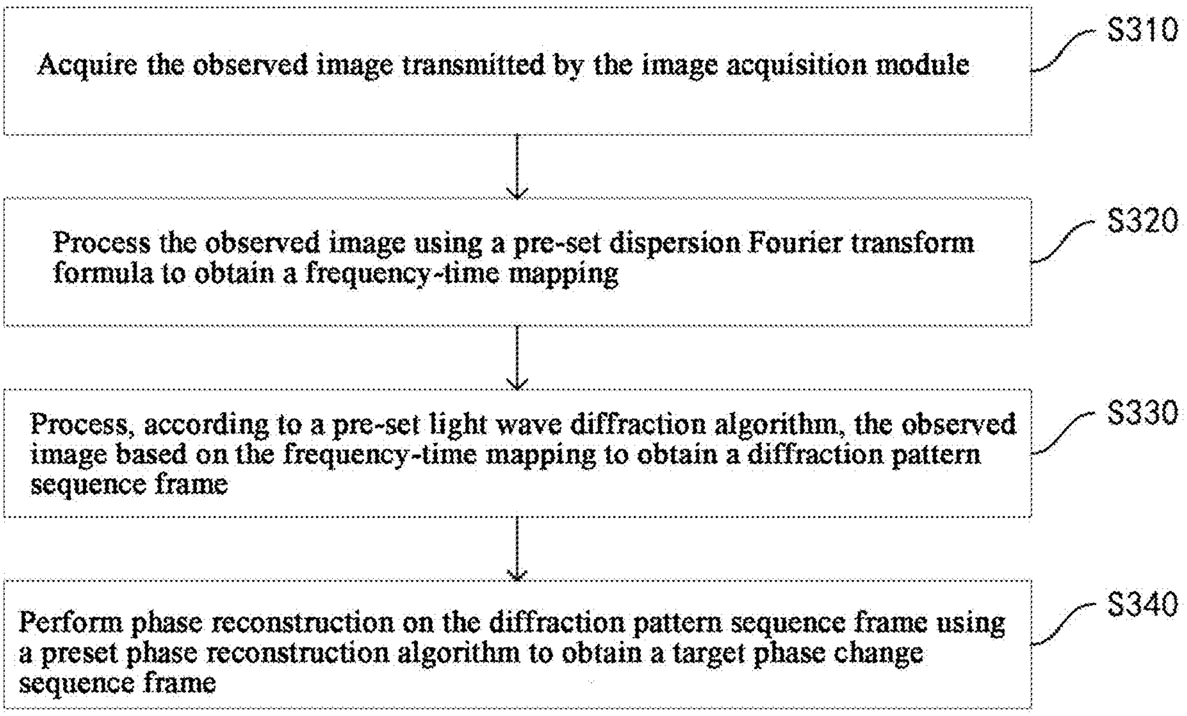
FIG. 3 is a flowchart of an ultrafast diffraction imaging method provided in another embodiment of the present disclosure.

Referring to FIG. 3, which is a flowchart of an ultrafast diffraction imaging method provided in another embodiment of the present disclosure, the ultrafast diffraction imaging method is applied to the control processing module 150 of the above ultrafast diffraction imaging system 100, the ultrafast diffraction imaging method includes but is not limited to the following steps:

Step S310: acquiring the observed image transmitted by the image acquisition module;

Step S320: processing the observed image using a preset dispersion Fourier transform formula to obtain a frequency-time mapping;

Step S330: processing, according to a preset light wave diffraction algorithm, the observed image based on the frequency-time mapping to obtain a diffraction pattern sequence frame; and Step S340: performing phase reconstruction on the diffraction pattern sequence frame using a preset phase reconstruction algorithm to obtain a target phase change sequence frame.

It will be appreciated that by acquiring the observed image transmitted by the image acquisition module 140, processing the observed image using a preset dispersion Fourier transform formula, mapping the optical spectrum of the laser to a time domain waveform through the dispersion Fourier transform formula to obtain a frequency-time mapping to facilitate subsequent real-time spectrum measurement of an ultrafast dynamic scene, and then processing the observed image according to a preset light wave diffraction algorithm based on the frequency-time mapping to obtain a diffraction pattern sequence frame, the calculation efficiency can be effectively improved. By using a preset phase reconstruction algorithm to perform phase reconstruction on the diffraction pattern sequence frame to obtain a target phase change sequence frame, the high-precision quantitative imaging of phase process of non-repeatable ultrafast dynamic scenes can be realized. Moreover, the efficiency of ultrafast diffraction imaging can be effectively improved while realizing the observation of phase changes in ultrafast dynamic scenes.

In some embodiments of the present disclosure, the dispersion Fourier transform formula is:

$$A(L,T)=\exp\left[i\frac{T^2}{2\beta_2 L}\right]\mathring{A}(0,\omega)\Big|_{\omega=\frac{T}{\beta_2^L}},$$

wherein $\beta$ is a propagation constant of the optical fiber, $\omega$ is an angular frequency, $\omega_0$ is centre frequency of a dissipative structure, T is the time within a reference frame, $T=t-\beta_1 L$, L is the length of the optical fiber, t is the time of the optical fiber, and m order derivative of $\beta$ is $$\beta_m=\frac{d^m\beta}{d\omega^m}\Big|_{\omega=\omega_0}.$$

It will be appreciated that when only second order dispersion is considered, and non-linear effects and losses in the optical fiber are not considered, the impulse response function can be expressed as:

$$H(\omega-\omega_0)=\exp\left[\frac{i(\omega-\omega_0)^2}{2}\beta_2 L\right],$$

wherein $\beta_2 L$ corresponds to the group velocity dispersion of the optical fiber, with its time domain response function as follows:

$$h(T)=\exp\left[i\frac{T^2}{2\beta_2 L}\right],$$

then, the output pulse A(0, T) is output as follows:

$$A(L,T)=A(0,T)*h(T)=\int_{-\infty}^{\infty}A(0,T')\exp\left[i\frac{(T-T')^2}{2\beta_2 L}\right]dT'.$$

According to the definition of Fourier transform, the dispersion Fourier transform formula can be obtained:

$$A(L,T)=\exp\left[i\frac{T^2}{2\beta_2 L}\right]\mathring{A}(0,\omega)|_{\omega=\frac{T}{\beta_2^L}},$$

wherein $\mathring{A}(0, \omega)$ represents the Fourier transform of the function A(0, T). It can be seen from the dispersion Fourier transform formula that after the laser has been stretched in time, spectral information will be mapped to the time domain, thus obtaining a frequency-time mapping.

In some embodiments of the present disclosure, the light wave diffraction algorithm is $$U_P(x,y,z)=\mathcal{F}^{-1}\mathcal{F}\left[[U_P(x,y)]e^{i\frac{2\pi z}{\lambda}\sqrt{1-(\lambda f_x)^2-(\lambda f_y)^2}}\right],$$

wherein $U_P(x,y)$ is a phasor of the observed image, $$e^{i\frac{2\pi z}{\lambda}\sqrt{1-(\lambda f_x)^2-(\lambda f_y)^2}}$$

is a phase delay factor, and $\mathcal{F}$ is a Fourier transform sign.

It will be appreciated that an electromagnetic vector can be expressed for monochromatic electromagnetic waves as: $E(r,t)=U(r)e^{-iwt}$.

Meanwhile, the phasor U(r) satisfies the Helmholtz equation: $(\nabla^2+k^2)U(r)=0$, wherein $$k=\frac{2\pi}{\lambda}.$$

It is assumed that the distance between a diffraction screen and an observation screen is z, $U_Q(x,y)$ and $U_S(x,y)$ are phasors on the diffraction screen and the observation screen, respectively. In the frequency domain, the spectrum functions corresponding to the phasors on the diffraction screen and the observation screen are $G_Q(f_x, f_y)$ and $G_S(f_x, f_y)$, and then:

$$G_Q(f_x,f_y)=\int\int_{-\infty}^{+\infty}U_Q(x,y)\,e^{-i2\pi(f_x x+f_y y)}dxdy,$$

$$G_S(f_x,f_y)=\int\int_{-\infty}^{+\infty}U_S(x,y)\,e^{-i2\pi(f_x x+f_y y)}dxdy.$$

Therefore, $U_S(x,y)$ is the inverse Fourier transform of $G_S(f_x, f_y)$, so that:

$$U_S(x,y)=\int\int_{-\infty}^{+\infty}G_S(f_x,f_y)\,e^{-i2\pi(f_x x+f_y y)}dxdy.$$

This formula is taken into the Helmholtz equation, and U satisfies the Helmholtz equation to obtain:

$$(\nabla^2+k^2)G_S(f_x,f_y)\,e^{-i2\pi(f_x x+f_y y)}=$$

-continued 0, which is calculated and finished to obtain:

$$G_S(f_x, f_y) = G_Q(f_x, f_y)\, e^{i\frac{2\pi z(f_x}{\lambda}\sqrt{1-(\lambda f_x)^2-(\lambda f_y)^2}},$$

In addition, $G_Q(f_x, f_y)$ is a special solution when z=0.

It can be seen from above that the result of a light wave propagating along the z axis appears in the frequency domain as multiplying the spectrum $G_Q(f_x, f_y)$ of the diffracted light by a phase delay factor $$e^{i\frac{2\pi z}{\lambda}\sqrt{1-(\lambda f_x)^2-(\lambda f_y)^2}}$$

associated with z.

The propagation process of the light wave in a free space from the diffraction screen to the observation screen is equivalent to passing an ideal low-pass filter will radius $$\frac{1}{\lambda}$$

in the frequency domain. By referring to the Fourier transform sign, the light wave diffraction algorithm can be obtained as:

$$U_P(x, y, z) = \mathcal{F}^{-1}\mathcal{F}\left[[U_P(x, y)]\, e^{i\frac{2\pi z}{\lambda}\sqrt{1-(\lambda f_x)^2-(\lambda f_y)^2}}\right].$$

Figure 4:
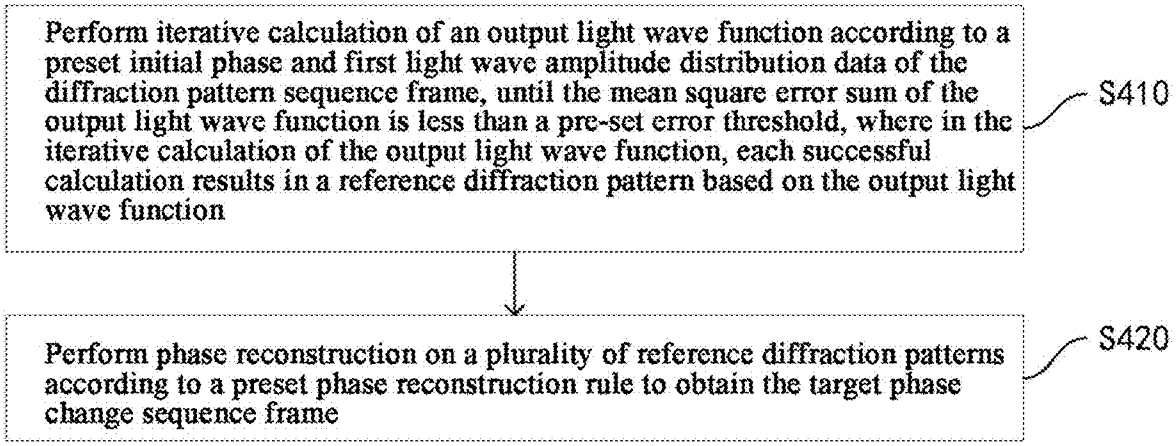
FIG. 4 is a flow chart for obtaining a target phase change sequence frame provided in another embodiment of the present disclosure.

Referring to FIG. 4, in an embodiment, step S340 in the embodiment shown in FIG. 3 further includes, but is not limited to, the following steps:

Step S410: performing iterative calculation of an output light wave function according to a preset initial phase and first light wave amplitude distribution data of the diffraction pattern sequence frame, until the mean square error sum of the output light wave function is less than a preset error threshold, where in the iterative calculation of the output light wave function, each successful calculation results in a reference diffraction pattern based on the output light wave function; and Step S420: performing phase reconstruction on a plurality of reference diffraction patterns according to a preset phase reconstruction rule to obtain the target phase change sequence frame.

It should be noted that the embodiments of the present disclosure do not limit the specific content of the preset phase reconstruction rule. The rule may follow a chronological sequence, or be based on the sequence of obtaining a reference diffraction pattern according to an output light wave function, etc. It will be appreciated that performing phase reconstruction on a plurality of reference diffraction patterns according to a chronological rule can obtain a more accurate target phase change sequence frame, so as to ensure the authenticity and reliability of the observation of phase changes in ultrafast dynamic scenes.

It will be appreciated that the iterative calculation of the output light wave function is performed according to the preset initial phase and the first light wave amplitude distribution data of the diffraction pattern sequence frame, until the mean square error sum of the output light wave function is less than a preset error threshold, which can effectively improve the reliability of subsequently obtaining the reference diffraction pattern according to the output light wave function. In the iterative calculation of the output light wave function, each successful calculation results in a reference diffraction pattern based on the output light wave function, so as to perform phase reconstruction on a plurality of reference diffraction patterns according to a preset phase reconstruction rule to obtain a target phase change sequence frame, which can realize high-precision quantitative imaging of the phase process of non-repeatable ultrafast dynamic scenes, and can effectively improve the efficiency of ultrafast diffraction imaging while realizing the observation of phase changes in ultrafast dynamic scenes.

Figure 5:
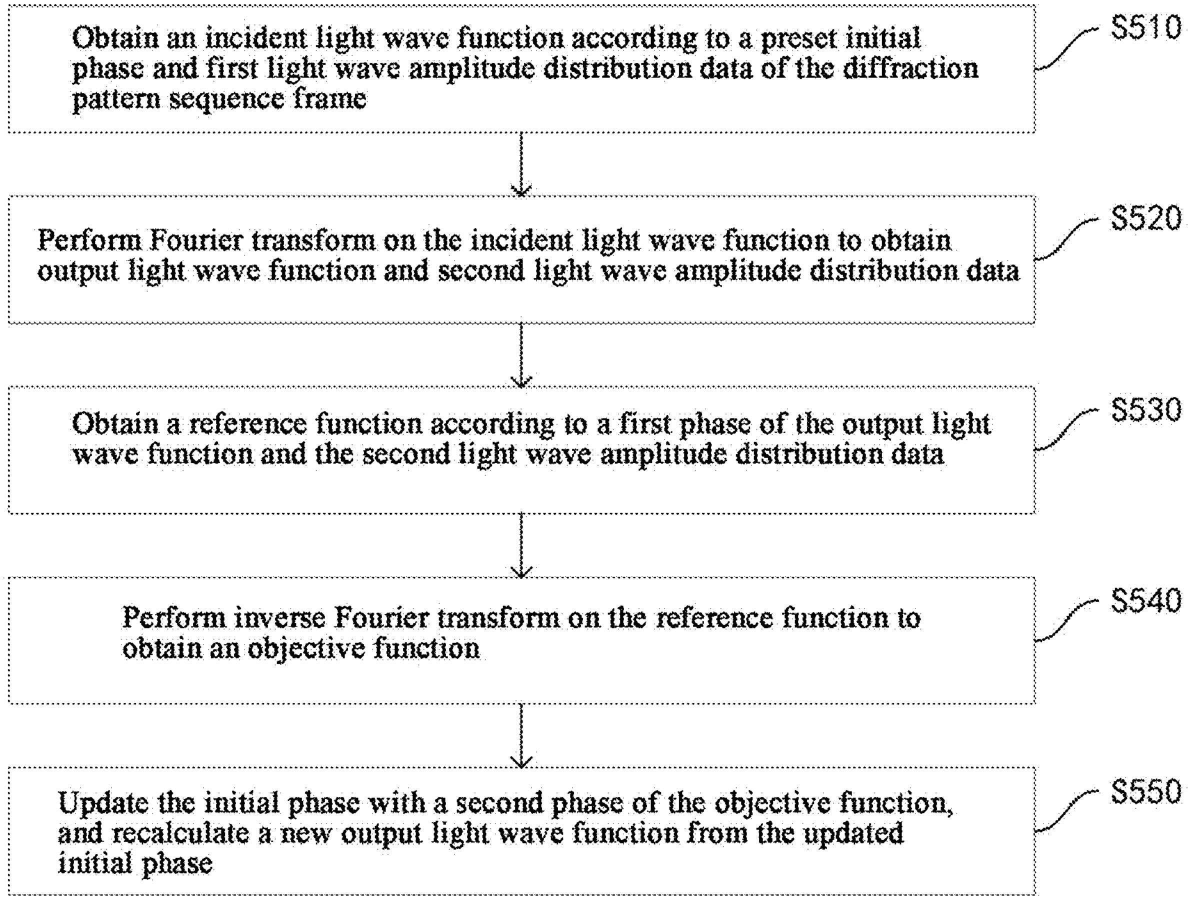
FIG. 5 is a flowchart of an iterative calculation method provided in another embodiment of the present disclosure.

In addition, referring to FIG. 5, in an embodiment, step S410 in the embodiment shown in FIG. 4 further includes, but is not limited to, the following steps:

Step S510: obtaining an incident light wave function according to a preset initial phase and first light wave amplitude distribution data of the diffraction pattern sequence frame;

Step S520: performing Fourier transform on the incident light wave function to obtain an output light wave function and second light wave amplitude distribution data;

Step S530: obtaining a reference function according to a first phase of the output light wave function and the second light wave amplitude distribution data;

Step S540: performing inverse Fourier transform on the reference function to obtain an objective function; and Step S550: updating the initial phase with a second phase of the objective function, and recalculating a new output light wave function according to the updated initial phase.

It will be appreciated that an incident light wave function is obtained according to a preset initial phase and first light wave amplitude distribution data of a diffraction pattern sequence frame, a Fourier transform is performed on the incident light wave function to obtain an output light wave function and second light wave amplitude distribution data, a reference function is obtained according to the first phase of the output light wave function and the second light wave amplitude distribution data, an inverse Fourier transform is performed on the reference function to obtain an objective function, finally the initial phase is updated using the second phase of the objective function, and a new output light wave function is recalculated according to the updated initial phase. The reliability of subsequently obtaining the reference diffraction pattern according to the output light wave function can be effectively improved through multi-level iterative calculation.

It will be appreciated that in an embodiment, the initial phase on an input plane may be randomly set, designated as $\phi(x,y)$, which is combined with the light wave amplitude distribution data $|F(x,y)|$ measured on the known input plane, to form an incident light wave function f(x,y). Then, Fourier transform is performed on f(x,y) to obtain an output light wave function g(u,v) on an output plane thereof; the first phase of g(u,v) is taken and combined with the amplitude distribution data $|G(u,v)|$ of the second light wave measured on the output surface to constitute g'(u,v); the inverse Fourier transform is performed on g'(u,v) to obtain an objective function f'(x,y); the second phase of f'(x,y) is taken to update the initial phase $\phi(x,y)$ to replace $\phi(x,y)$, and a new output light wave function is calculated according to the updated initial phase. In this embodiment, the mean square error of the output light wave function can be expressed as:

$$SSE = \left[\int\int(|g(u, v)| - |G(u, v)|)^2 dudv\right] / \left[|G(u, v)|^2 dudv\right].$$

Figure 6:
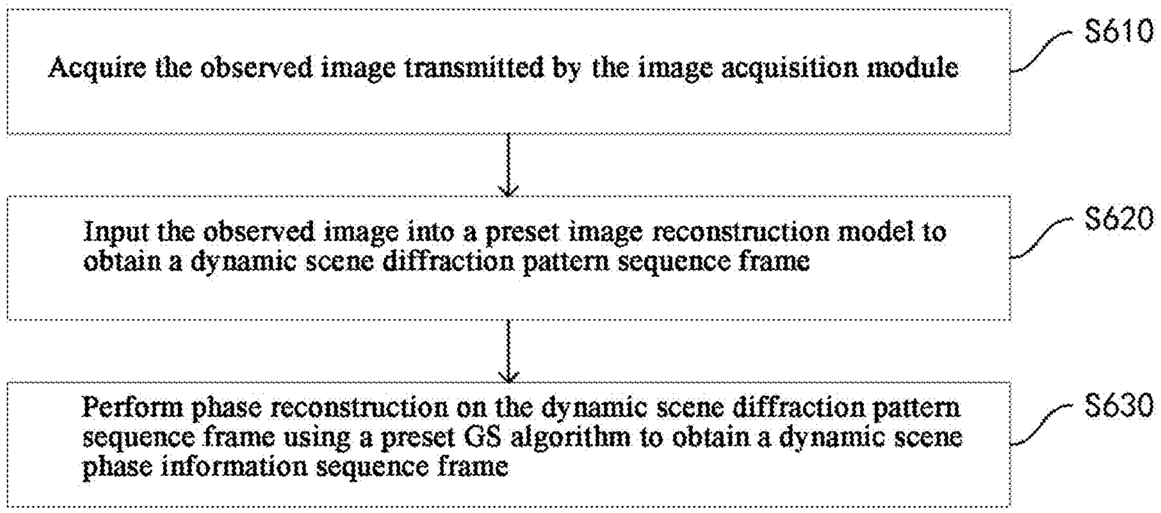
FIG. 6 is a flowchart of the ultrafast diffraction imaging method provided in another embodiment of the present disclosure.

Additionally, referring to FIG. 6, in an embodiment, the ultrafast diffraction imaging method may further include, but is not limited to, the following steps:

Step S610: acquiring the observed image transmitted by the image acquisition module;

Step S620: inputting the observed image into a preset image reconstruction model to obtain a dynamic scene diffraction pattern sequence frame; and Step S630: performing phase reconstruction on the dynamic scene diffraction pattern sequence frame using a preset GS algorithm to obtain a dynamic scene phase information sequence frame.

It will be appreciated that after the dynamic process of laser is encoded by the encoding module 130, the image acquisition module 140 clips the dynamic scene and captures the clipped scene to obtain a compressed dynamic scene diffraction pattern, i.e., an observed image. The control processing module 150 of the ultrafast diffraction imaging system 100 acquires the observed image transmitted by the image acquisition module 140, and inputs the observed image into a preset image reconstruction model to obtain a dynamic scene diffraction pattern sequence frame. A preset GS algorithm is then used to perform phase reconstruction on the dynamic scene diffraction pattern sequence frame to obtain a dynamic scene phase information sequence frame, which can realize the observation of phase changes in ultrafast dynamic scenes.

In addition, an embodiment of the present disclosure further provides a computer-readable storage medium storing computer-executable instructions that are executed by a processor or controller, e.g. by a processor, to cause the processor to perform the ultrafast diffraction imaging method applied to the control processing module 150 of the ultrafast diffraction imaging system 100 in the above embodiments, e.g. to perform the method steps S310 to S340 in FIG. 3, method steps S410 to S420 in FIG. 4, method steps S510 to S550 in FIG. 5, and method steps S610 to S630 in FIG. 6 described above. It will be appreciated by those of ordinary skill in the art that all or some of the steps of the methods disclosed above, and system, may be implemented as software, firmware, hardware, and appropriate combinations thereof. Some or all of physical components may be implemented as software executed by a processor, such as a central processing unit, a digital signal processor, or a microprocessor, or as hardware, or as an integrated circuit, such as an application specific integrated circuit. Such software may be distributed on a computer-readable medium, which may include a computer storage medium (or non-transitory medium) and a communication medium (or transitory medium). As is well known to those of ordinary skill in the art, the term computer storage medium includes volatile and nonvolatile, removable and non-removable media implemented in any method or technology for storage of information (such as computer readable instructions, data structures, program modules or other data). Computer storage media include, but are not limited to, RAM, ROM, EEPROM, flash memory or other memory technology, CD-ROM, digital versatile disk (DVD) or other optical disk storage, magnetic cassettes, magnetic tapes, magnetic disk storage or other magnetic storage devices, or any other media that can be used to store the desired information and that can be accessed by a computer. Moreover, it is well known to those of ordinary skill in the art that communication media typically contain computer-readable instructions, data structures, program modules or other data in a modulated data signal such as a carrier wave or other transport mechanism, and may include any information delivery medium.

In the description of this specification, when referring to the terms "an embodiment", "some embodiments", "exemplary embodiments", "examples", "specific examples", or "some examples" and the like, it means that the specific features, structures, materials, or characteristics described in conjunction with the embodiment or example are included in at least an embodiment or example of the present disclosure. In this specification, schematic representations of the above terms do not necessarily refer to the same embodiment or example. Furthermore, the specific features, structures, materials, or characteristics described may be combined in a suitable manner in any one or more embodiments or examples.

The above is a specific description of the preferred embodiments of the present disclosure, but the present disclosure is not limited to the above implementations, and those of ordinary skills in the art may make various equivalent deformations or substitutions without departing from the gist of the present disclosure, and these equivalent deformations or substitutions are all included in the scope defined by the claims of the present disclosure.

What is claimed is:

1. An ultrafast diffraction imaging method applied to the control processing module of an ultrafast diffraction imaging system comprising:

a laser generation module configured to emit laser;

a time stretching module optically connected to the laser generation module and configured to stretch the laser into a time data stream;

an encoding module optically connected to the time stretching module and configured to perform encoding according to the time data stream to obtain an encoding matrix;

an image acquisition module connected to the encoding module and configured to capture the encoding matrix to obtain an observed image; and a control processing module respectively in communicative connection with the laser generation module and the image acquisition module, and configured to perform phase reconstruction according to the observed image transmitted by the image acquisition module to obtain a target phase change sequence frame;

the method comprising:

acquiring the observed image transmitted by the image acquisition module;

processing the observed image using a preset dispersion Fourier transform formula to obtain a frequency-time mapping;

processing, according to a preset light wave diffraction algorithm, the observed image based on the frequency-time mapping to obtain a diffraction pattern sequence frame; and performing phase reconstruction on the diffraction pattern sequence frame using a preset phase reconstruction algorithm to obtain a target phase change sequence frame.

2. The ultrafast diffraction imaging method according to claim 1, wherein the dispersion Fourier transform formula is $$A(L,T)=\exp\left[i\frac{T^2}{2\beta_2 L}\right]\dot{A}(0,\omega)|_{\omega=\frac{T}{\beta_2^L}},$$

wherein β is a propagation constant of an optical fiber, ω is an angular frequency, $\omega_0$ is a centre frequency of a dissipative structure, T is time within a reference frame, $T=t-\beta_1 L$, L is a length of the optical fiber, t is time of the optical fiber, and m order derivative of β is $$\beta_m=\frac{d^m\beta}{d\omega^m}|_{\omega=\omega_0}.$$

3. The ultrafast diffraction imaging method according to claim 1, wherein the light wave diffraction algorithm is:

$$U_P(x,y,z)=\mathcal{F}^{-1}\mathcal{F}\left[[U_P(x,y)]\,e^{i\frac{2\pi z}{\lambda}\sqrt{1-(\lambda f_x)^2-(\lambda f_y)^2}}\right],$$

wherein $U_p(x, y)$ is a phasor of the observed image, $$e^{i\frac{2\pi z}{\lambda}\sqrt{1-(\lambda f_x)^2-(\lambda f_y)^2}}$$

is a phase delay factor, and $\mathcal{F}$ is a Fourier transform sign.

4. The ultrafast diffraction imaging method according to claim 1, wherein the performing phase reconstruction on the diffraction pattern sequence frame using a preset phase reconstruction algorithm to obtain a target phase change sequence frame comprises:

performing iterative calculation of an output light wave function according to a preset initial phase and first light wave amplitude distribution data of the diffraction pattern sequence frame, until the mean square error sum of the output light wave function is less than a preset error threshold, wherein in the iterative calculation of the output light wave function, each successful calculation results in a reference diffraction pattern based on the output light wave function; and performing phase reconstruction on a plurality of reference diffraction patterns according to a preset phase reconstruction rule to obtain the target phase change sequence frame.

5. The ultrafast diffraction imaging method according to claim 4, wherein the performing iterative calculation of an output light wave function according to a preset initial phase and first light wave amplitude distribution data of the diffraction pattern sequence frame comprises:

obtaining an incident light wave function according to a preset initial phase and first light wave amplitude distribution data of the diffraction pattern sequence frame;

performing Fourier transform on the incident light wave function to obtain an output light wave function and second light wave amplitude distribution data;

obtaining a reference function according to a first phase of the output light wave function and the second light wave amplitude distribution data;

performing inverse Fourier transform on the reference function to obtain an objective function; and updating the initial phase with a second phase of the objective function, and recalculating a new output light wave function according to the updated initial phase.

6. A non-transitory computer-readable storage medium, wherein the computer-readable storage medium stores computer-executable instructions for causing a computer to perform the ultrafast diffraction imaging method according to claim 1.

* * * * *